Dec. 29, 1925.  1,567,876

C. P. TURNER

MOTOR VEHICLE BODY

Filed July 3, 1924

Inventor:
Charles P. Turner,
by Eugene Ewan
Atty.

Patented Dec. 29, 1925.

1,567,876

UNITED STATES PATENT OFFICE.

CHARLES P. TURNER, OF EAST ST. LOUIS, ILLINOIS.

MOTOR-VEHICLE BODY.

Application filed July 3, 1924. Serial No. 723,853.

*To all whom it may concern:*

Be it known that I, CHARLES P. TURNER, a citizen of the United States, residing at East St. Louis, in the county of St. Clair and State of Illinois, have invented new and useful Improvements in Motor-Vehicle Bodies, of which the following is a specification.

This invention relates to motor vehicle bodies particularly designed for tourists, campers, sportsmen, and the like.

One object of my invention is to incorporate in the body structure a made-up cot or bed to facilitate sleeping at night when either camping or touring.

Another object of my invention is to make the cot or bed carrying compartment of the body dust and moisture proof so that the bedding and equipment carried therein will be kept clean and dry while traveling as well as camping in all kinds of weather.

Another object of my invention is to make the body of such shape and size that it will be light in weight without sacrificing the required rigidity and be capable of being applied to a Ford chassis and others of the lighter makes.

Other and further objects of my invention will appear from the following specification, taken in connection with the accompanying drawings, in which—

Figs. 6 and 7 are vertical sectional views of details of construction to be hereinafter described.

Figure 1:
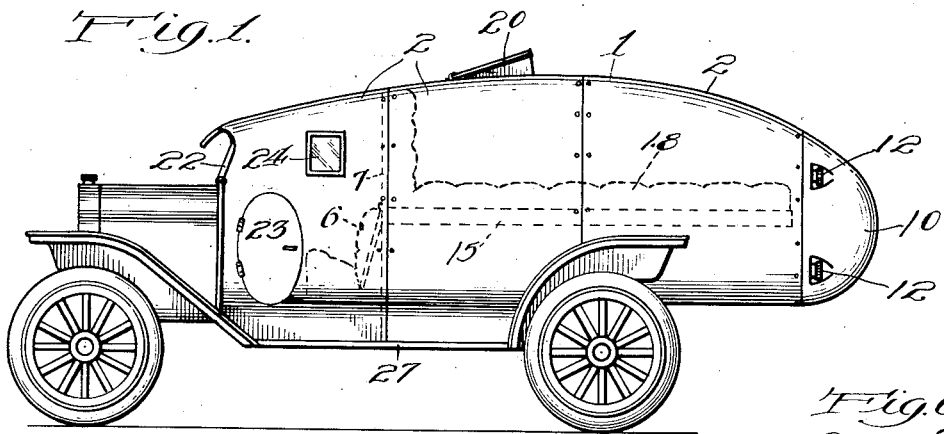
Fig. 1 is a side elevational view of a motor vehicle equipped with a body of my invention.
Figure 2:
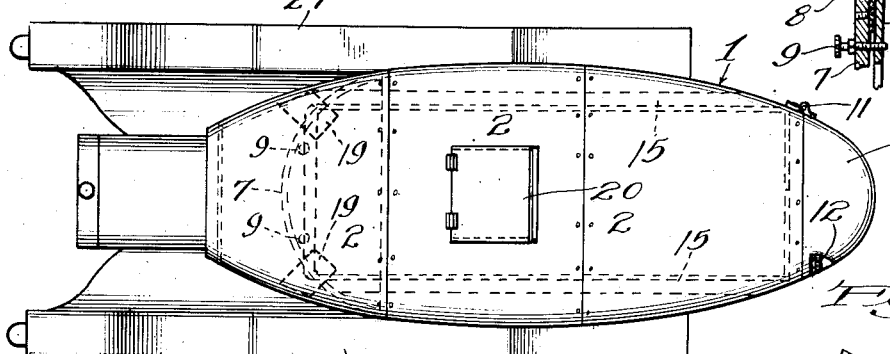
Fig. 2 is a top plan view of the same.
Figure 3:
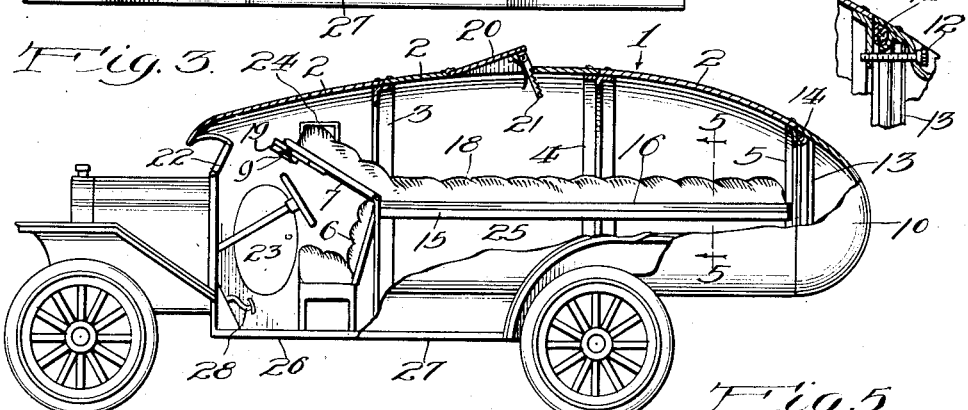
Fig. 3 is a side view with the body parts in longitudinal section to show the bed or cot therein.
Figure 4:
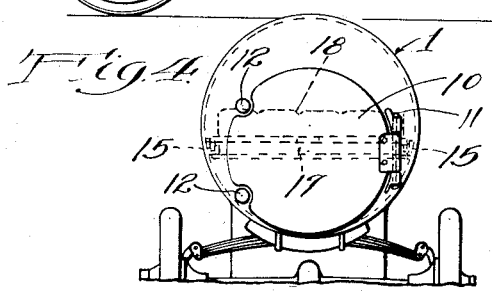
Fig. 4 is a rear view of the vehicle.

In the drawings, I have shown the body 1 of my invention mounted in a Ford chassis. The body is preferably made of light sheet metal, as in the form of suitably curved plates 2, 2, riveted or otherwise rigidly secured to a structural framework, consisting of metal members 3, 4, and 5. The body is given stream-line shape as much as possible and in cross-section is generally cylindrical or tubular, as shown in Fig. 4. In longitudinal section, the body is somewhat oval, as indicated in Figs. 1 to 3.

Figure 6:
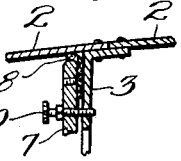

The front seat 6 is forward of the front frame member 3, and hinged either to the frame member 3 or to the back of said seat is a door 7. This door closes against the structural member 3 above the seat and carries a resilient weather or like strip 8 to make a dust-proof and moisture-tight joint between the structural member 3 and the adjacent body plate 2 when the door is closed, as in Fig. 6. Fastening screws 9 carried by the door 7 engage in threaded openings in the frame member 3 to hold the door tightly closed, as shown in Fig. 6. Lock nuts may be used with the screws, as shown. As shown by dotted lines in Fig. 2, the door 7 at its hinged edge extends clear across the width of the body and, together with the seat 6, divides the body transversely into front and rear sections or compartments, with the seat in the front one. The other or swinging edge of the door is curved to conform to the curvature of the body so that the door will fit against the body and the structural member 3 when closed.

The rear end of the body 1 is preferably made conical, as shown in the drawings, and such end of the body constitutes a door 10 hinged at one side, as at 11, and provided at the other side with two lock screws 12, 12. These screws take into the adjacent frame member 5 when holding the door closed. This rear door 10 is provided on its inside with a channel member 13, carrying a resilient weather or like strip 14 to fit against the adjacent frame member 5 when the door is closed and make a dust and moisture tight joint. This structure is clearly shown in Fig. 7. The strip 8 and ring 14 may be of rubber or other material suitable for the purpose.

Figure 5:
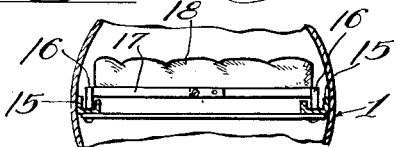
Fig. 5 is a vertical section through the cot or bed on line 5—5 of Fig. 3.

In the body 1, between the doors 7 and 10, are horizontally arranged cot or bed supporting bars or members 15, 15. These members are rigidly secured in place and are preferably in line with the hinged edge of the door 7. As shown in Fig. 5, the bars 15 are channel-shape to receive the side flanges 16 of a cot or bed frame 17. This frame carries a mattress or pad 18, the forward end of which extends upon the rear side of the door 7, as shown in Fig. 3. The frame 17 is maintained in fixed position in the body 1 by engagement at its front end either with the back of the front seat 6 or the frame member 3 and engagement at its rear end with the side walls of the body adjacent the rear door 10. The mattress 18 is suitably fixed to the frame so that the cot or bed is a permanent fixture in the body.

When the cot is not in use, the front door 7 is closed and locked tight, as shown in dotted lines in Fig. 1, and with the rear door 10 closed and locked tight the bed is in a dust proof and water tight compartment and thus is maintained clean and dry while the car is traveling in all kinds of weather. When in use, the door 7 is swung down into the inclined position shown in Fig. 3 and is supported in that position by resting on brackets 19, 19 fixed to the side walls of the body 1 in the front compartment. For ventilation the rear door may be opened and in addition the body 1 may be provided above the cot with a ventilator 20 hinged to the top wall of the body. To hold the ventilator open, a suitable spring pressed nothed bar 21 is hinged to the inside of the same and engages an edge of the opening, as shown in Fig. 3. The ventilator is made to fit dust and water tight against the body when closed.

The front plate 2 of the body extends over and beyond the windshield 22, and the space between the parts is closed by sheet metal. Said front plate is provided in its vertical sides with hinged doors 23. These may be elliptical and concave to conform to the general contour of the body. These side walls are also provided with windows 24. The space 25 below the cot or bed 18 provides a compartment for the carrying of luggage, supplies, equipment, and the like.

With the bed or cot carried made-up in the body, preparations for sleeping at night along the roadside or in camp merely require opening the doors 7 and 10 and getting into the body through the rear door 10. Moreover, the bedding and equipment being in a dust proof and moisture tight compartment protects the bedding and equipment from dust and rain and keeps it clean and dry. Should it be desired to remove the bed or cot, the frame 17 is preferably made of hinged parts for collapsing, as shown in Fig. 5.

The body of my invention is particularly designed for tourists, campers, sportsmen and others requiring equipment carrying and sleeping facilities incorporated directly in the car. The necessity of stopping before dark to locate a suitable camp site and then the work of making camp with the usual preparations for the night, as well as the work of breaking up camp in the morning and packing bedding and equipment on the running-board and elsewhere, as heretofore, are avoided by my invention. With my invention time and labor are saved in being free of these duties, thus adding to the pleasure of camping and touring.

As shown in Fig. 3, the floor 26 of the front section is dropped down to the level of the running-boards 27, 27. This allows keeping the center of gravity of the body low, and also giving leg room in the front compartment. With a Ford chassis, the pedals 28 are reversed to be below their shafts instead of above them as heretofore.

While I have shown and described herein in detail a motor vehicle body of my invention, it is of course to be understood that the details of construction and arrangement of parts may be variously changed and modified without departing from the spirit and scope of my invention.

I claim as my invention:

1. An automobile body divided transversely into a front compartment containing a seat and a rear compartment containing a cot-frame, a hinged door between the front and rear compartments and swingable into the front one, a pad or mattress carried by the cot-frame and having a portion on said door, and a closure for the rear end of the body.

2. An automobile body divided transversely by the front seat into a front compartment and a rear compartment, a cot-frame in the rear compartment above the bottom wall thereof, a hinged door above the back of the front seat and swingable into the front compartment, a pad or mattress on said cot-frame and having its front portion carried on the back of said door, a closure for the rear end of the body, and weather or like strips at the edges of said door and closure, respectively, to make dust proof joints when closed.

3. An automobile body divided transversely into a front compartment containing a seat and a rear compartment containing a cot-frame, a hinged door between the front and rear compartments and swingable into the front one, a pad or mattress carried by the cot-frame and having a portion on said door, a closure for the rear end of the body, and a ventilator in the body above said cot-frame.

4. An automobile body divided transversely by the front seat into a front compartment and a rear compartment, a hinged door above the back of the front seat and swingable into the front compartment, a cot-frame supported in the rear compartment by the side portions thereof above the bottom of the compartment and extending horizontally across and lengthwise of the same, a pad or mattress on said frame and having its front portion carried on the back of said door, a hinged door closing the rear end of the body, and resilient strips carried by said doors to make dust-proof joints when closed.

5. An automobile body made of a structural framework and sheet metal plates secured thereto and divided transversely by the front seat into front and rear compartments, a door hinged at the back of the front seat and swingable into the front compartment, a bed or cot-frame supported in the rear compartment above the bottom thereof, a pad or mattress on said cot-frame and having its front portion on the back of said door, a hinged door closing the rear end of the body, and resilient strips carried by said doors for making dust-proof joints when closed against the body.

In testimony that I claim the foregoing as my invention, I affix my signature this 30 day of June, 1924.

CHARLES P. TURNER.